United States Patent [19]

Doyle

[11] 4,416,133
[45] Nov. 22, 1983

[54] AUTOMATIC MACHINE FOR FINISHING COOKWARE BODY BLANKS

[75] Inventor: Edward A. Doyle, Sheboygan, Wis.

[73] Assignee: E. A. Doyle Manufacturing Corporation, Sheboygan, Wis.

[21] Appl. No.: 315,667

[22] Filed: Oct. 28, 1981

[51] Int. Cl.³ .............................................. B21D 39/08
[52] U.S. Cl. ........................................... 72/58; 72/80; 72/405; 72/421
[58] Field of Search ....................... 72/71, 80, 58, 405, 72/421; 413/69, 70, 71, 73

[56] References Cited

U.S. PATENT DOCUMENTS

| | | | |
|---|---|---|---|
| 1,784,745 | 12/1930 | Nier | 72/68 |
| 2,455,768 | 12/1948 | Herman | 72/71 |
| 2,929,345 | 3/1960 | Zatyko | 72/58 |
| 3,881,436 | 5/1975 | Paumier et al. | 72/421 |
| 4,026,226 | 5/1977 | Hahn | 72/405 |
| 4,030,432 | 6/1977 | Miller et al. | 413/69 |
| 4,176,536 | 12/1979 | Pankhin et al. | 413/69 |

*Primary Examiner*—Leon Gilden
*Attorney, Agent, or Firm*—James E. Nilles

[57] ABSTRACT

A machine for finishing substantially cup-shaped blanks that are to comprise the bodies of saucepans or the like has a table on which the blanks slide horizontally, bottom wall down. They are advanced along the table from station to station by a shuttle conveyor comprising opposite horizontal clamping plates that converge edgewise to engage opposite side wall portions of blanks, move forwardly while converged, then diverge and move rearward to an idle position. At one station there is a hole in the table, and each blank is delivered concentrically onto a freely rotatable tail stock which is in a lowered position in said hole with its top surface level with the table surface. The tail stock rises to clamp the bottom wall of the blank against a concentric continuously rotating driver head spaced above the table. After rotational finishing of the blank, a coaxial freely rotatable knockout descends from the driver head, maintaining the blank clamped against the tail stock while the latter returns to its lowered position where its rotation is braked. The knockout then rises into the driver head, ready for the next blank. At a subsequent station a hydraulic press can reform the bottom portion of the blank to a concentric enlarged diameter bulge.

14 Claims, 17 Drawing Figures

AUTOMATIC MACHINE FOR FINISHING COOKWARE BODY BLANKS

FIELD OF THE INVENTION

This invention relates to apparatus for performing finishing operations upon substantially cup-shaped blanks that are to comprise the bodies of sauce pans or the like, each having a bottom wall, an upright substantially cylindrical side wall, and a flange around the top edge of its side wall; and the invention is more particularly concerned with an automatic machine whereby substantially all finishing operations can be performed upon a blank of the character described, including those finishing operations that require the blank to be rotated about its axis in relation to a tool or tools engaged against it and those performed upon the blank while it is not in rotation.

BACKGROUND OF THE PRIOR ART

Heretofore the manufacture of sauce pans and similar cookware has required a substantial amount of labor because each of the several steps in the manufacturing operation was performed by a different machine, and workpieces had to be transported from machine to machine and manually fed into each machine and removed from it.

Typically, the manufacture of an aluminum sauce pan body starts with a flat disc that is inserted into a heavy press to be formed into a more or less cup-shaped blank having a bottom wall, an upright substantially cylindrical side wall, and a rim around the top of its side wall that projects either upwardly or radially outwardly. Usually the production of this blank requires successive forming operations whereby the blank is progressively deepened.

The blank thus produced must be subjected to certain finishing operations that require it to be rotated in engagement with a tool, and to certain other finishing operations during which it remains stationary.

Especially in the case of an aluminum piece, the outer surface of the unfinished blank has a roughness sometimes referred to as "orange peel" that is removed by rotating the blank while forcefully engaging it with an axially moving smoothing tool. The flange-like rim around the top of the blank has an irregular edge and must be trimmed to a uniform width by means of a cutting tool that also engages the blank while it is rotating. After it is trimmed this flange is usually reformed in some manner, as by folding or curling it downward to produce a bead or the like around the top edge of the vessel, and, again, such reforming is accomplished by means of a tool that engages the piece while it is rotating. There are other possible operations that may be performed while the blank rotates, such as the formation of shallow ornamental grooves in the outer surface of its side wall.

The finishing operations that may be performed while the piece is stationary include piercing its side wall with a hole or holes for handle attachment, stamping a trademark or the like on the underside of the bottom wall, and panelling the bottom wall, that is, upwardly offsetting its central portion to prevent the pan from rocking when heated.

Heretofore these finishing operations have required a substantial amount of hand labor, performed with at least two machines. For its rotation, the blank was manually inserted into a chuck and manually removed from it. Once the blank was chucked and rotating, the several tools that performed the finishing operations could be engaged against it automatically, but the machine nevertheless required the substantially constant presence of an attendant who chucked and removed the workpieces. The finishing operations that were performed with the blank stationary were accomplished at a machine that likewise required substantially constant attendance for insertion and removal of workpieces.

The amount of labor required for production of cookware has had some tendency to place American manufacturers at a competitive disadvantage with manufacturers in foreign countries where labor is cheap. Until recent years, however, American cookware manufacturers had not suffered unduly from foreign competition because manufacturers in countries with very cheap labor had been unwilling or unable to invest in the heavy, expensive blanking presses and other machines needed for cookware manufacture.

In the last few years the competitive situation has changed to the marked disadvantage of American manufacturers, owing to the introduction of a style of cookware which has become very popular and which has heretofore been regarded as suitable only for low capital, labor intensive production. Such cookware is characterized by an enlarged diameter bulged bottom portion on the body of the vessel. The blank for such a vessel has heretofore been produced by a spinning operation that can be performed with simple and inexpensive machinery but requires a substantial amount of labor. Understandably, most of the cookware of that style has been imported into the United States from countries that have abundant low cost labor, and because of its popularity, it has cut into the sale of American-made cookware.

While it is technically possible to employ a press for imparting a bulge to the bottom portion of a blank initially formed with a substantially cylindrical side walk, the presses heretofore available that would have been capable of such work were very expensive. Interest and amortization costs on the high capital investment in such a press, plus the cost of labor for loading and unloading it one piece at a time, would have precluded economically feasible competition with imported products.

The need for automating the production of cookware, and particularly for automating the finishing operations, has been apparent for a long time. Heretofore, however, those skilled in the art have not known how to accomplish such automation. Particularly baffling has been the problem of automating the finishing operations that require rotation of the workpiece, owing to the complex manipulations considered necessary for chucking and unchucking the workpiece. The blank has to be brought into proximity to the chuck without conflict with the tools intended to engage the workpiece, it has to be centered relative to the chuck, the chuck has to be closed while the workpiece is held in a proper position and orientation, and subsequently the chuck has to be opened and the workpiece removed from it, again without conflict with the tools.

Reasonable efficiency requires that the workpiece be transported mechanically to and from each of at least two finishing stations, at one of which the workpiece is rotated and at the other of which it is maintained stationary. Heretofore it was by no means obvious how a simple, inexpensive and fast acting conveyor could effect the necessary transport of workpieces, considering that the conveyor must establish each workpiece at the proper location and orientation at each station but must nevertheless be so arranged that both it and the workpieces remain clear of the instrumentalities that operate on the workpiece at each station.

SUMMARY OF THE INVENTION

The general object of this invention is to provide an automatic machine for performing finishing operations upon a blank of the above-described character, including finishing operations which require rotation of the blank about its axis and finishing operations for which the blank remains stationary.

More specifically it is an object of this invention to provide an automatic machine for finishing such blanks, having two blank finishing stations, at one of which the blank is rotated about its axis while it is engaged by one or more finishing tools and at the other of which the blank is maintained stationary while other operations are performed upon it, said machine having a simple, compact and efficient conveyor whereby each of a succession of blanks is picked up at a receiving station, transported first to one and then to the other of said finishing stations, and then discharged from the machine, said conveyor being arranged to establish each blank in a proper position and orientation at each of said operation stations and to operate in such a manner that the conveyor and the blanks are clear of instrumentalities at said finishing stations during transport of the blanks, and the conveyor is clear of both the blanks and said instrumentalities while operations are performed upon the blanks at said stations.

Another object of the invention is to provide an automatic machine which is capable of performing substantially all finishing operations upon blanks of the character described and which is relatively low in cost but is nevertheless capable of operating without the constant presence of an attendant.

A further and more specific object of the invention is to provide an automatic machine of the character described that is extremely versatile, being readily adaptable for any finishing operations that may be desired and being quickly and easily adjustable to accommodate blanks of a wide range of diameters and heights.

BRIEF DESCRIPTION OF DRAWINGS

In the accompanying drawings, which illustrate what is now regarded as a preferred embodiment of the invention.

DETAILED DESCRIPTION OF PREFERRED EMBODIMENT OF THE INVENTION

Infeed Mechanism

In the accompanying drawings, the numeral 5 designates generally a blank finishing machine of this invention to which blanks 6 are delivered by means of an endless infeed conveyor 7. The blanks 6 may be intended to comprise the bodies of sauce pans, for example, or may be destined to serve as vessels of other types, but in any case each blank, as delivered to the machine 5 has a substantially flat bottom wall 9, an upright substantially cylindrical side wall 10, and a rim or flange 11 around the top of its side wall which, in this case, is shown as projecting radially outwardly. Since the blanks 6 are delivered to the machine 5 in the condition in which they are formed by a blanking press (not shown), it will be understood that the flange 11 is of irregular width (as measured radially) and that the surface of each blank may have a characteristic "orange peel" roughness that must be smoothed by "ironing" while the blank rotates.

Attention is directed to the fact that every blank 6 is placed on the infeed conveyor 7 with its axis upright and its flange 11 uppermost, and the blank maintains that orientation as it moves along the infeed conveyor and all during the time it is in the finishing machine 5.

The feed conveyor 7 can be a belt or chain conveyor that operates continuously and thus constantly urges forwardly the blanks 6 that are on its top stretch, sliding along under them when their advance is obstructed. Mounted on fixed structure near the front of the infeed conveyor are front and rear gates 14, 15 and a proximity sensor 16. Each of the gates 14, 15 comprises a cylinder jack—preferably pneumatic—that has its axis horizontal and transverse to the direction of travel of the conveyor 7 to project its piston rod 14a, 15a across the path of blanks 6 on the conveyor and block their advance. The front gate 14 can be mounted in a fixed position; the rear gate 15 is adjustable on the fixed structure in directions parallel to the length of the conveyor to be normally established at a distance behind the front gate 14 that is substantially equal to the diameter of the blanks 6 to be processed. The sensor 16 is mounted between the gates 14 and 15.

In an initial condition, the piston rod 14a of the front gate 14 is extended, to block the advance of the front blank 6 on the conveyor, and the piston rod 15a of the rear gate 15 is retracted so that blanks can pass it. As forward movement of the conveyor brings a first blank into engagement with the front gate 14, the proximity sensor 16 detects the presence of that blank and issues an output which causes the piston rod 15a of the rear gate to be extended, so that the second blank from the front cannot pass the rear gate. That output also causes retraction of the piston rod 14a of the front gate, to allow the conveyor 7 to carry the front blank off of its front end and onto a downwardly inclined ramp 17. The released blank slides down the ramp 17 and onto the rear portion of a table 18 of the finishing machine 5.

When the front blank has passed out of the zone between the gates 14, 15, the sensor 16 responds to the absence of a blank in that zone by issuing another output which reverses the condition of the piston rods 14a, 15a, so that the next blank on the conveyor can pass the rear gate 15 and be moved forward into engagement with the front gate 14.

In general, the infeed conveyor 7 operates at a speed such that blanks are delivered to the machine 5 at the rate at which they are processed through it.

The manner in which the gates 14, 15 are caused to operate in response to impulses from the sensor 16 will be evident to those skilled in the pertinent art. It will be understood that actuation of the gates 14, 15 can be conditioned upon the issuance of other outputs in addition to those from the sensor 16, to prevent a blank from being fed to the machine 5 until the machine is ready to receive it.

To avoid the need for end-to-end conveyors, the upper stretch of the endless conveyor 7 has its front end at a level above the table 18 of the finishing machine 5 so that blanks can move from that conveyor onto the machine table 18 by sliding down the inclined ramp 17.

General Arrangement of the Machine

The stationary structure of the machine 5 comprises a base portion 12 upon which the table 18 is vertically adjustably supported. Extending upwardly from the base portion 12 is a sturdy superstructure 13 that carries movable components located above the level of the table.

Figure 1:
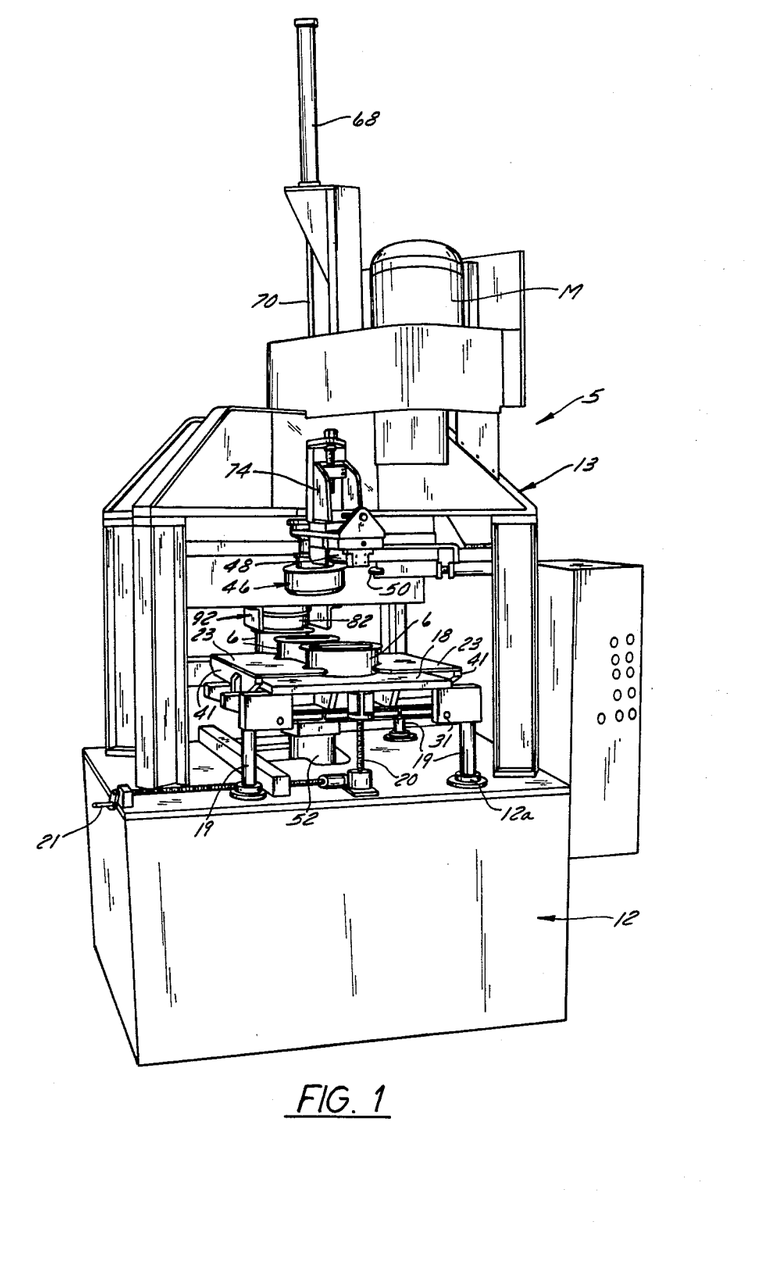
FIG. 1 is a perspective view of the blanking finishing machine of this invention as seen from its infeed side.
Figure 14:
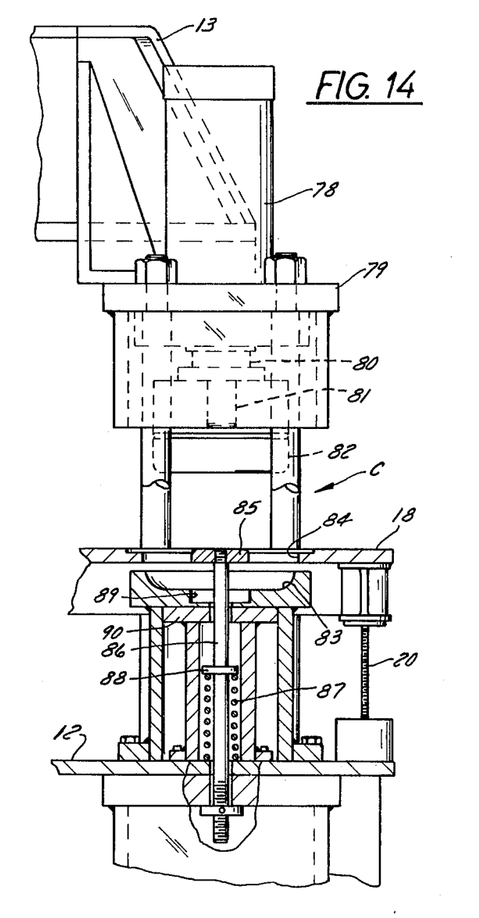
FIG. 14 is a view of the second operating station, partly in side elevation and partly in vertical section, with the press open.
Figure 16:
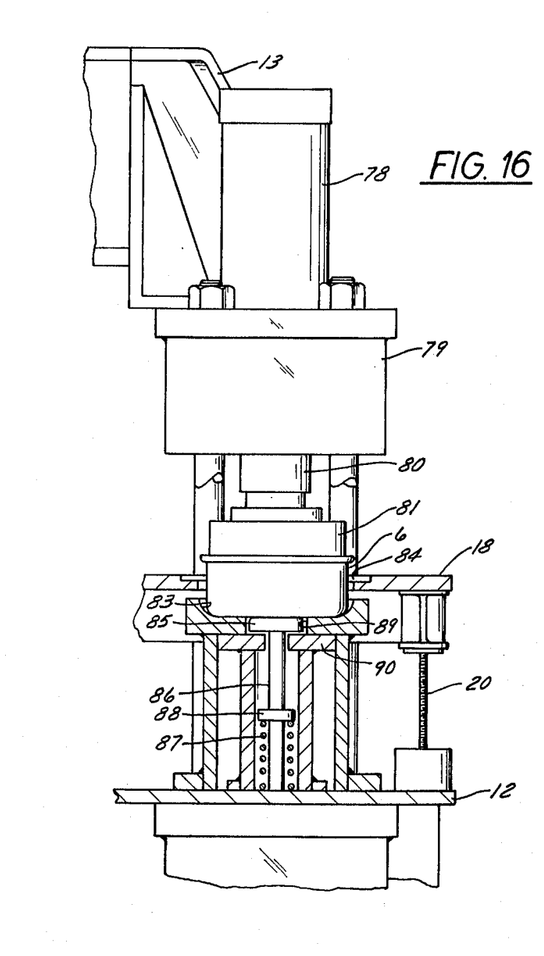
FIG. 16 is a view generally similar to FIG. 14 but showing the condition just after the male forming member has fully engaged a blank but before it has begun to reform the blank.

The table 18 comprises a horizontal rectangular plate. Guide posts 19 that project down from the four corners of the table 18 are slidably received in bushings 12a (FIG. 11) in the base portion 12 of the frame. Under each end of the table 18, substantially on its longitudinal centerline, is a screw jack 20 (FIGS. 1, 14, 16) by which the table can be adjustingly raised and lowered, and the two screw jacks 20 can be rotated simultaneously by means of a single hand crank 21 that is connected with both of them in any suitable manner.

The table 18 is elongated in the direction in which a blank 6 moves through the machine. As a blank slides along the top of the table 18, it moves into and out of each of three defined stations A, B and C, at each of which it dwells for a time. All three stations are normally occupied by blanks 6, and the stations are spaced apart at uniform distances sufficient to provide adequate clearance between the blanks.

The first station A is a receiving station near the rear of the table 18, where a newly arrived blank rests in a ready position. The other two stations B and C are operating stations at which work is performed on the blank. The operations performed at the first operating station B, which is located substantially at the center of the table 18, are those that require the blank to be rotating. At the second operating station C, located near the front of the table, there is a press and such other tools as are needed for performing the remaining finishing operations upon the blank. It will be apparent that the principles of this invention could be readily applied to the design of a machine having more than two operating stations.

A sensor 22 in the table 18 detects the presence of a blank 6 at the receiving station A and issues an output which allows the blanks on the table 18 to be advanced when work is finished at each of the operating stations B and C. It will be evident that the sensor 22 can be connected in a logic circuit with the sensor 16 for control of the gates 14 and 15 of the infeed conveyor 7.

Shuttle Conveyor

The blanks are slidingly moved from station to station by means of a shuttle conveyor comprising a pair of horizontal clamping plates 23 that are confined to edgewise translatory motion at a small distance above the top surface of the table 18. The two clamping plates 23, which are mirror images of one another, overlie opposite side portions of the table 18, and each is elongated in the direction lengthwise of the table, having a length to span two of the three stations A, B, C.

The opposing or inner edges of the clamping plates 23 have opposite bays or cutouts 24 which are preferably V-shaped and which are spaced lengthwise along each plate in correspondence with the spacing between stations. With three stations along the table 18, there are two bays or cutouts 24 in each plate 23.

Figure 2:
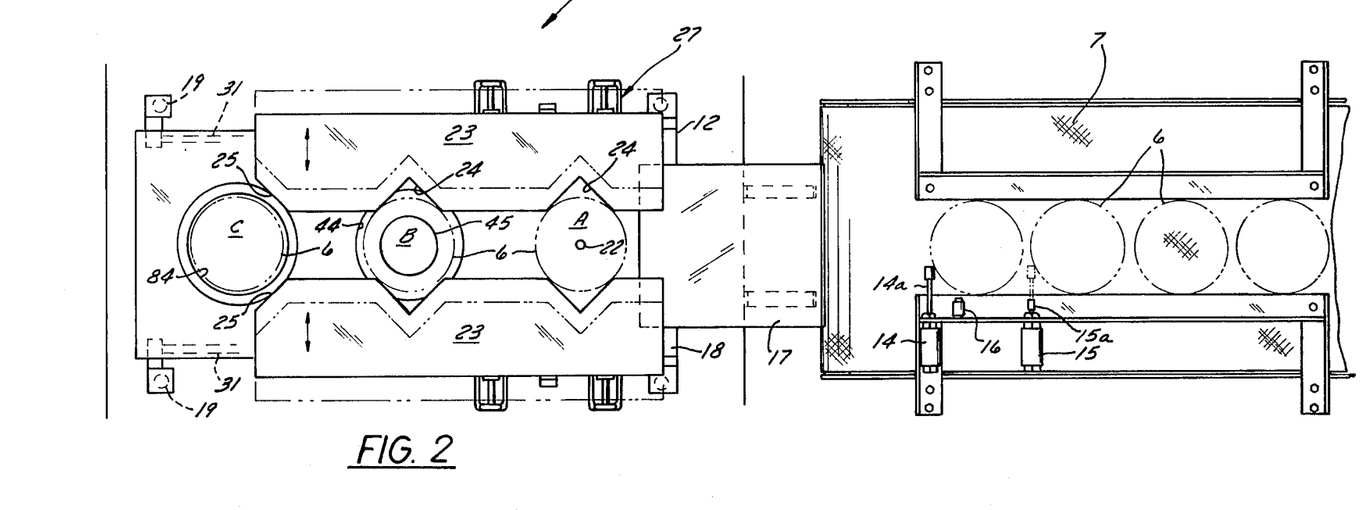
FIG. 2 is a plan view of the conveyor mechanisms by which blanks are transported to and through the machine; with the shuttle conveyor shown in its converged condition, ready to begin forward movement by which blanks are advanced from one station to another.
Figure 3:
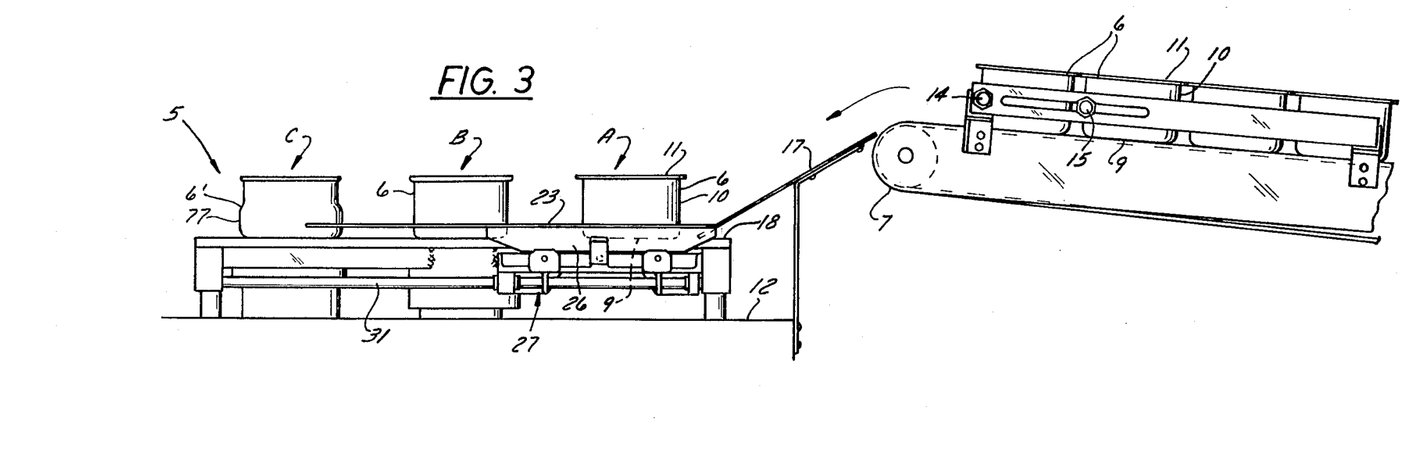
FIG. 3 is a view in side elevation of the conveyor mechanism shown in FIG. 2.

During most of an operating cycle of the shuttle conveyor, the clamping plates 23 are in idle positions (shown in FIG. 6) wherein they overlie rear portions of the table 18 and are in diverged relation to one another, with their inner edges spaced apart by a distance greater than the diameter of a blank. When blanks are to be advanced from station to station, the clamping plates 23 first converge in edgewise lateral movement to bring the edge portions of their bays 24 into embracing relation to blanks at the receiving station A and the first finishing station B, as shown in FIG. 2. At the same time, the blank at the front station C is engaged by an oblique front edge portion 25 on each plate that slants rearwardly and laterally inwardly. While the clamping plates 23 remain in converged relationship, they move edgewise forwardly in unison, through a distance equal to the center-to-center distance between stations, thereby constraining the blanks to slide forwardly along the table 18. The finished blank 6' (FIG. 5) that had been at the front station C is pushed forwardly off the front end of the table 18 and onto receiving means (not shown) such as a further conveyor, a chute or a storage bin.

Figure 4:
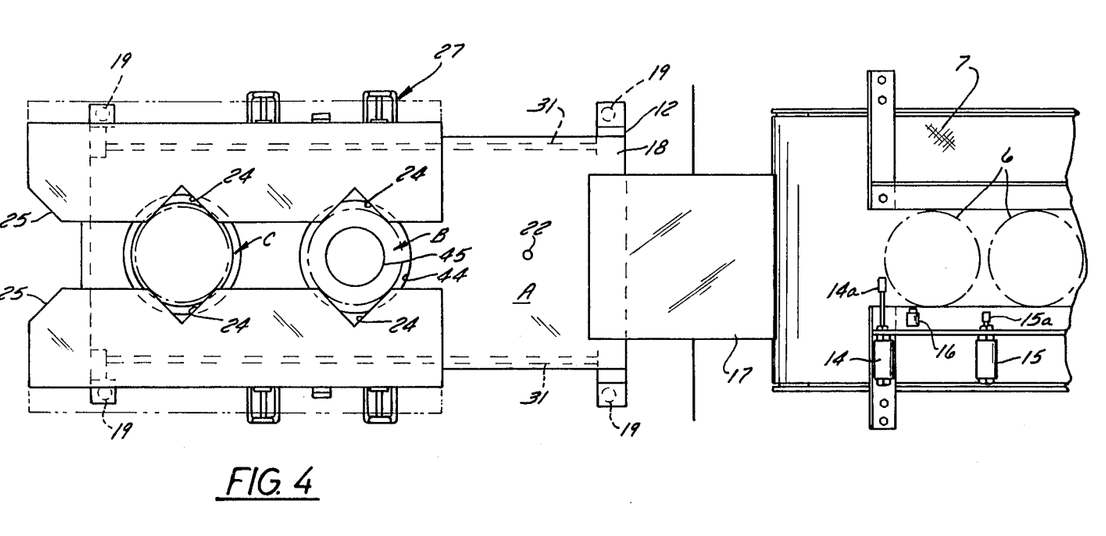
FIG. 4 is a view generally similar to FIG. 2 but showing the shuttle conveyor just at the conclusion of a forward movement.
Figure 5:
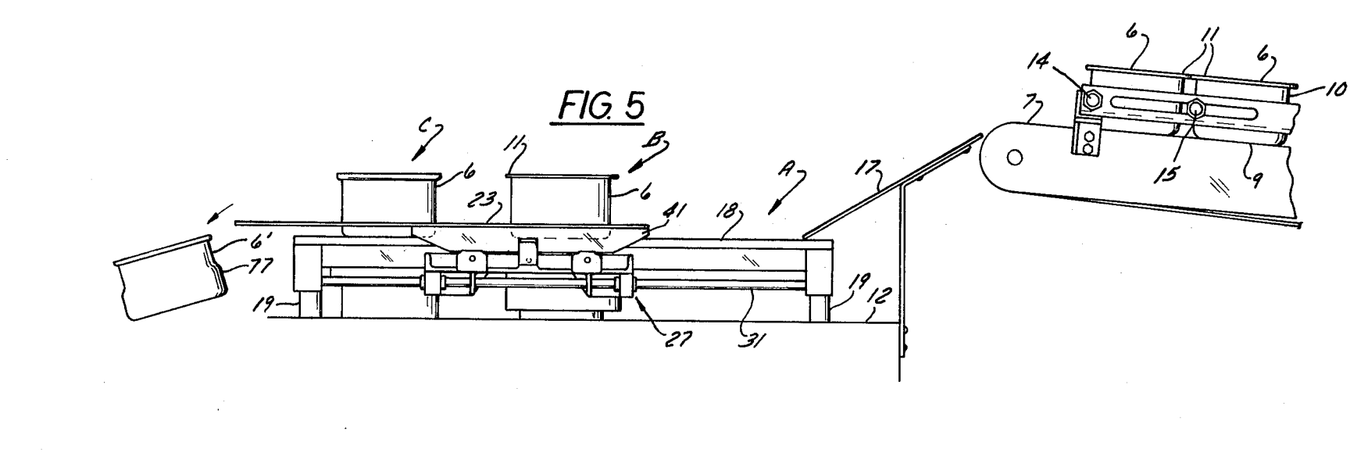
FIG. 5 is a view generally similar to FIG. 3 but showing the conveyor mechanism in the condition illustrated in FIG. 4.
Figure 6:
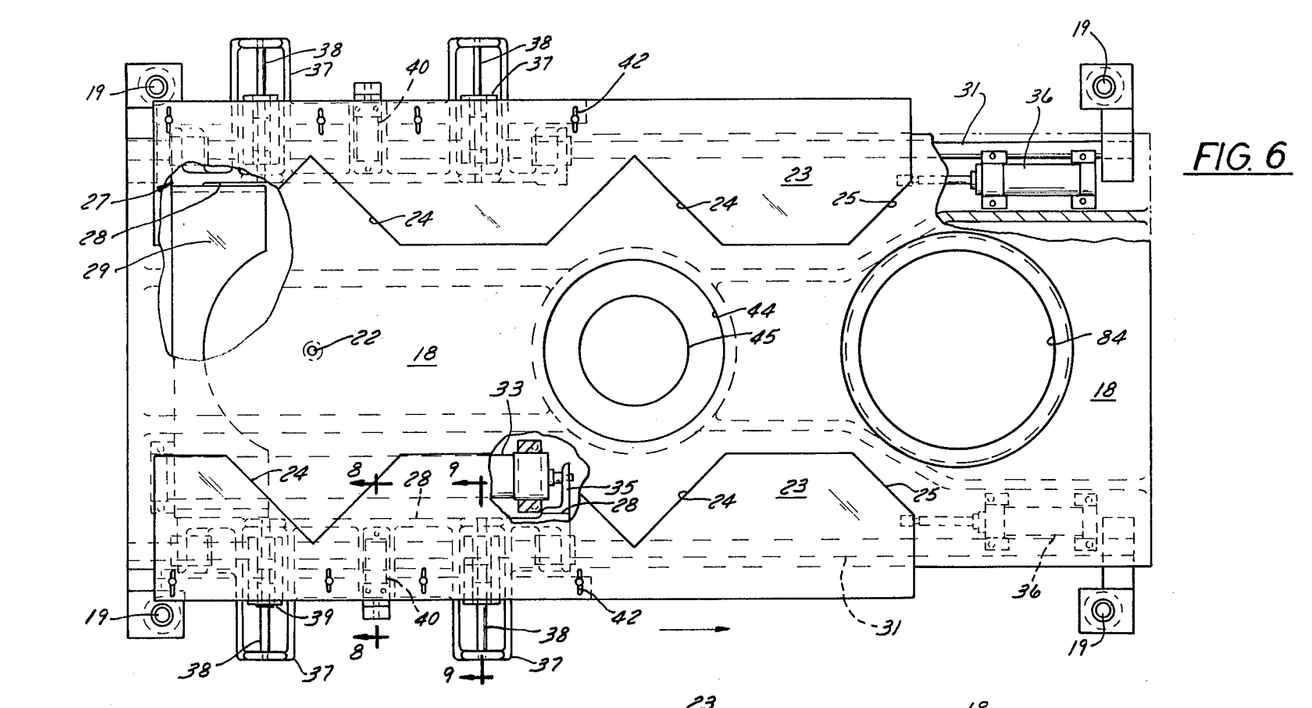
FIG. 6 shows the shuttle conveyor on a larger scale, mainly in plan view but with portions broken away to show details, and in its idle condition.
Figure 7:
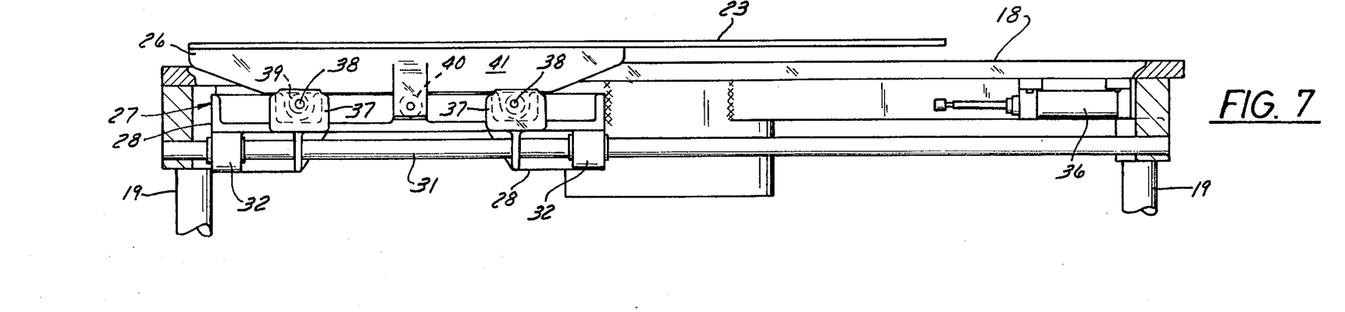
FIG. 7 is a view of the structure shown in FIG. 6, mainly in side elevation but with portions broken away.

At the concluisiond of their advancing movement, which brings them to the positions shown in FIGS. 4 and 5, the clamping plates 23 diverge edgewise laterally, to be well clear of the blanks that they have just delivered to the operating stations B and C, and they then move edgewise rearwardly back to their idle positions.

For their above described movements, the clamping plates 23 are mounted on respective upper carriages 26 which are movable from side to side on a U-shaped lower carriage 27 that is confined to forward and rearward movement.

The U-shaped lower carriage 27, which underlies the table 18, has two forwardly projecting legs 28 that are connected at their rear ends by a rigid transverse member 29. To confine the lower carriage 27 to backward and forward movement, it rides on parallel horizontal guide rods 31 that are fixed to the table 18 and underlie it near its opposite side edges, adjacent to the respective legs 28 of the lower carriage. A pair of bosses 32 on each legs 28, spaced along the length of the leg, comprise coaxial bushings that slidingly embrace the adjacent guide rod 31.

The lower carriage 27 is actuated for its backward and forward movement by means of a double-acting pneumatic jack 33 that has its cylinder secured to the underside of the table 18, a small distance inboard from one of the guide rods 31 and extending parallel to it, and has its piston rod connected to a laterally projecting bracket 35 on the adjacent leg 28 of the lower carriage. Underlying the front end portion of the table, near opposite sides thereof, are shock absorbers 36 that are engaged by the front ends of the carriage legs 28 at the conclusion of their advance, for smooth but rapid deceleration of the lower carriage 27. The shock absorbers 36 preferably comprise pneumatic cylinders with throttled air outlets. The lower carriage can be moved rearward relatively slowly, since the clamping plates 23 are then diverged and well clear of blanks at the station A, B, C.

Figure 8:
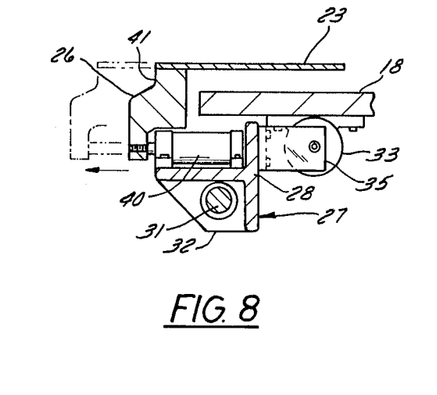
FIGS. 8 and 9 are detailed sectional views on an enlarged scale, respectively taken on the planes of the lines 8—8 and 9—9 in FIG. 6.
Figure 9:
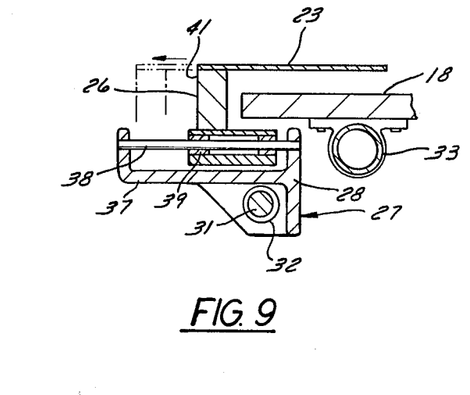
Figure 10:
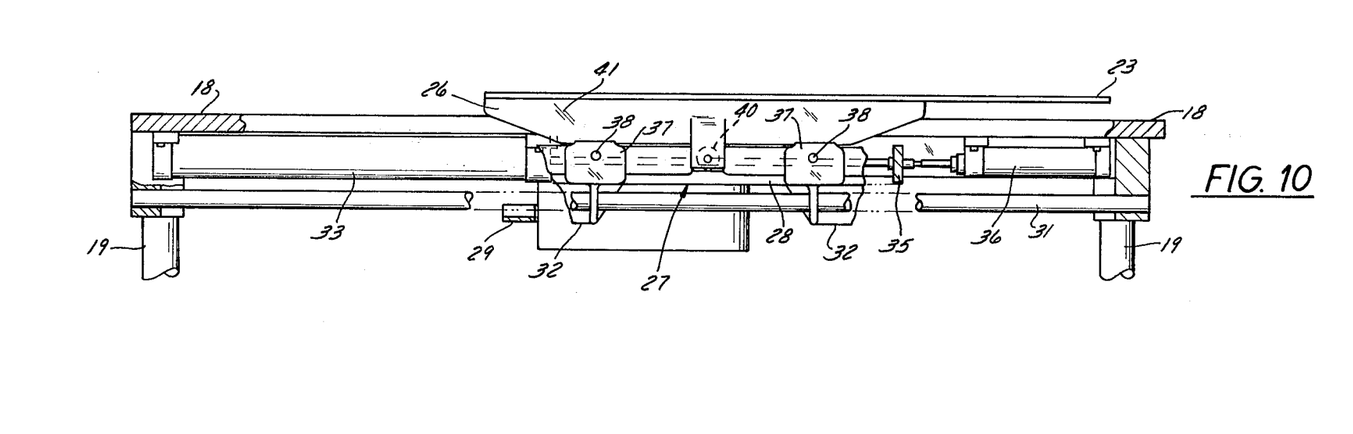
FIG. 10 is a view generally similar to FIG. 7 but showing the shuttle conveyor in its forward position.

Each of the upper carriages 26 has an elongated body portion 41 that extends lengthwise parallel to an adjacent leg 28 of the lower carriage and has an upper surface to which its clamping plate 23 is secured. To carry the respective upper carriages 26, each of the legs 28 of the lower carriage 27 has a pair of laterally outwardly projecting brackets 27 thereon, each such bracket being upwardly adjacent to one of the bosses 32 on the leg 28. Each of the brackets 37 supports a short laterally extending guide rod 38, and the body portion 41 of the upper carriage has on its bottom bushed tubular members 39 (see FIG. 9) that are slidably guided on the rods 38. Located between the brackets 37 is a small double-acting pneumatic jack 40 (see FIG. 8) whereby the adjacent upper carriage 26 is actuated in its lateral movement, which jack has its cylinder secured to the adjacent leg 28 of the lower carriage and has its laterally outwardly projecting piston rod connected to the upper carriage.

The body portion 41 of each upper carriage 26 is spaced outward from an adjacent side edge of the table 18 and projects upward to a level above the top surface of the table. The clamping plate 23 is secured on the flat top of the body portion 41 by means of bolts threaded into the body portion through laterally elongated slots 42 in the clamping plate that provide for lateral adjustment of the clamping plate to accommodate blanks of any expectable diameter.

The shuttle conveyor actuating jacks 33 and 40 are coordinated with one another by means of a control system (not shown) that will be understood by those skilled in the pertinent art, who will also appreciate that operation of these actuators 33 and 40 must be coordinated with the operation of tools at the operating stations and with the outputs from the sensors 16 and 22.

Because the guide rods 31 that carry the lower carriage 27 are constrained to move up and down with the table 18, vertical adjustment of the table 18 does not occasion any need for readjustment of the shuttle conveyor mechanism.

Mechanism at First Operating Station

Figure 11:
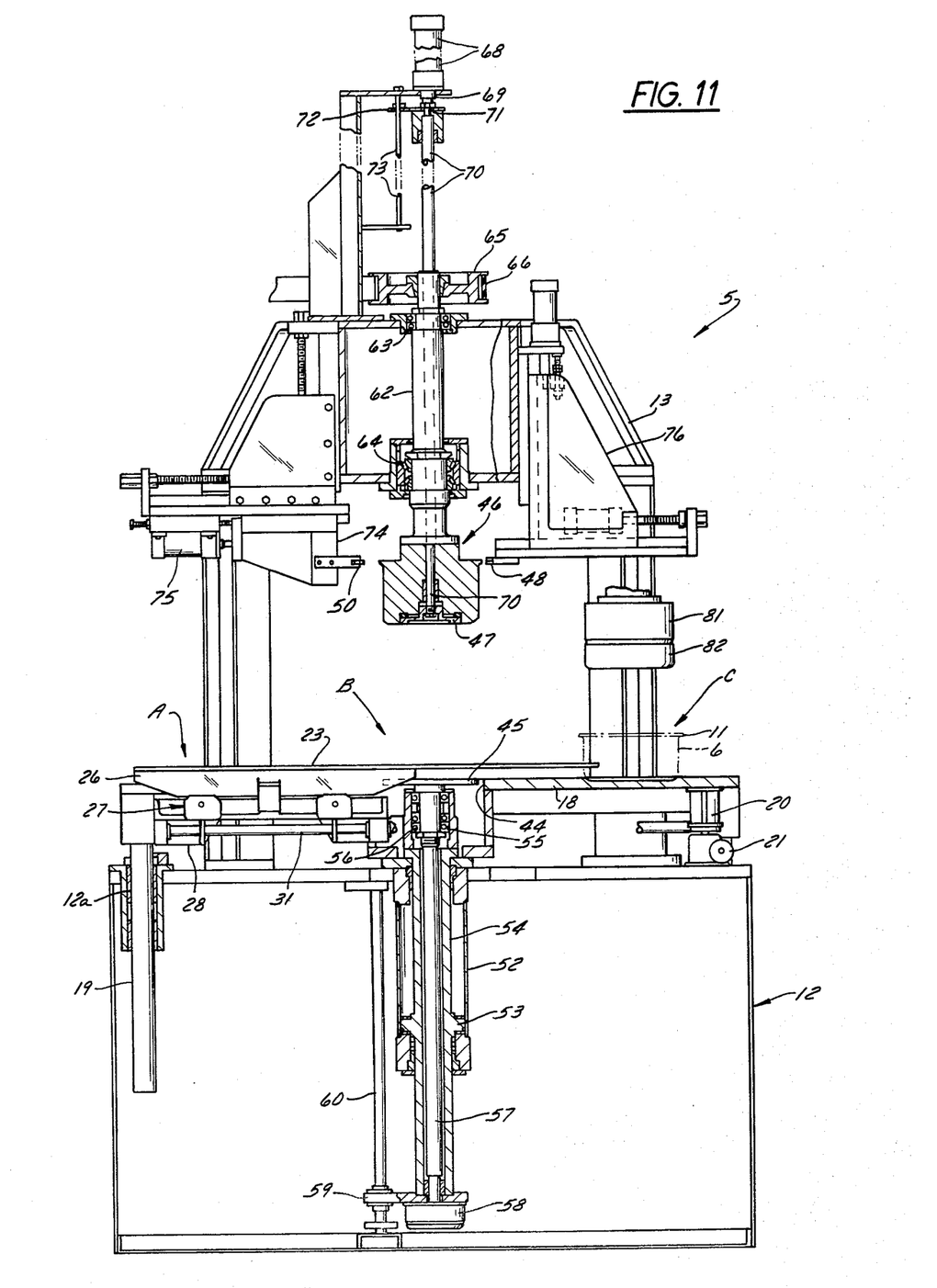
FIG. 11 shows the machine partly in side elevation, but in vertical section at the first operating station, with the mechanism at that station in the condition between finishing operations.
Figure 12:
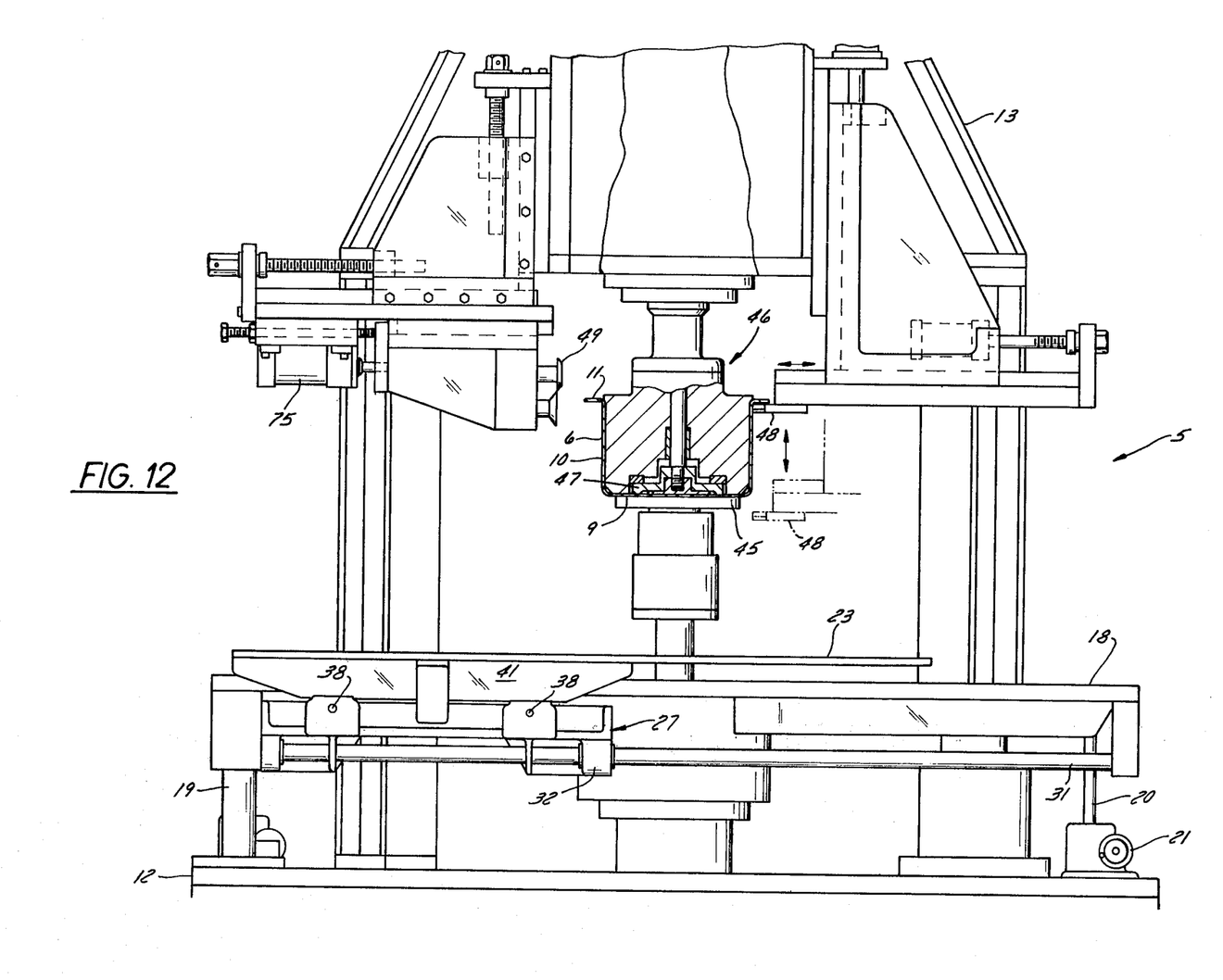
FIG. 12 is a view on a larger scale than FIG. 11, mainly in side elevation but partly in vertical section, showing conditions at the first operating station while a blank is being rotated.
Figure 13:
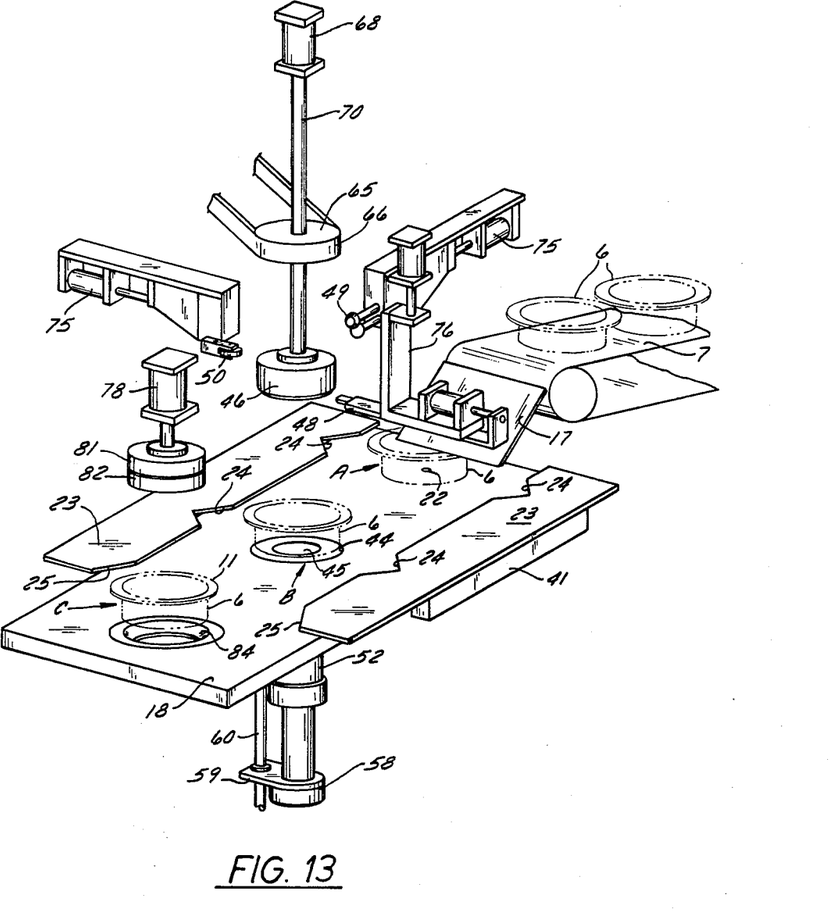
FIG. 13 is an exploded perspective view showing principal components of the machine.

At the first operating station B, as best seen in FIGS. 11-13, the blank 6 is rotated while several operations are performed upon it, namely, smoothing of the external surface of its side wall 10 by means of an axially moving ironing tool 48 that eliminates so-called orange-peel, trimming of its flange 11 by a cutter 49, and reforming of its flange into a bead or the like by means of a forming tool 50.

In the table 18 there is a relatively large circular hole 44 at the first operating station B, and concentric to this hole is an elevatable and freely rotatable disc-like tail stock 45 that fits in the hole 44 with some radial clearance. When blanks are shifted into and out of the first operating station B by the shuttle conveyor, the tail stock 45 is in a lowered position (FIG. 11) in which its flat top surface is coplanar with the top surface of the table 18. Thus a blank delivered to the first operating station is supported on the elevatable tail stock 45, in concentric relation to it. When the tail stock 45 is in its lowered position it is confined against rotation, as explained hereinafter; but whenever it is above that position it is freely rotatable.

Concentric to the tail stock 45 is a driving head 46 which is confined to a fixed location high enough above the table 18 to be clear of blanks being moved into and out of the first operating station B and which is normally driven for continuous rotation. After a blank is delivered to the first operating station B and the clamping plates 23 have diverged to be clear of it, the tail stock 45 rises, lifting the blank into concentric engagement with the rotating driving head 46 and clamping the bottom wall 9 of the blank against the flat underside of the driving head, thus constraining the blank to rotate with the driving head 46, as shown in FIG. 12. It will be apparent that the driving head 46 serves as a constantly rotating chuck with which the freely rotatable tail stock 45 cooperates. As the blanks rotates, the finishing tools 48, 49, 50 are moved radially inwardly towards it and are maintained in engagement with it during performance of their respective operations.

The rotatable driving head 46 is annular, and concentrically disposed within it is a freely rotatable knockout 47 that can project downwardly relative to it. When the work of the finishing tools 48, 49, 50 is completed and they have moved radially away from the blank, the knockout 47 moves downwardly out of the driving head 46. Since the ironing process tends to reduce the diameter of the blank, and the driving head 46 initially fits rather closely inside the blank to ensure concentric rotation, the knockout 47 dislodges the blank from the driving head. In doing so, the knockout 47 clamps the bottom wall 9 of the blank against the tail stock 45, and it maintains such clamping engagement while the tail stock descends all the way to its lowered position, flush with the table 18. During its descent the blank continues to rotate under its own momentum, and the freely rotatable knockout 47 and tail stock 45 spin with it while maintaining their clamping engagement that controls the blank for accurate return to the position at which the clamping plates 23 can reengage it. When the tail stock 45 reaches its lowered position it is braked to stop rotation of it and the blank. Promptly thereafter the knockout 47 rises to its retracted position, in which its bottom surface is slightly above the level of the bottom surface of the driving head 46.

In addition to the rotatable disc-like tail stock 45, the tail stock structure comprises an upright pneumatic cylinder 52 (FIG. 11) which has its upper end fixed to the table 18, in downwardly spaced relation to that table. Slidable in the cylinder 52 is an annular piston 53 having a concentric tubular piston rod 54 that projects beyond both ends of the cylinder. The cylinder 52 and its piston 53 comprise a double-acting actuator whereby the tail stock 45 is raised and lowered.

The upper end portion of the tubular piston rod 54 has an enlarged diameter, to provide a bearing chamber 55 wherein bearings 56 for the rotatable tail stock 45 are housed. Through the hollow piston rod 54 there extends a long shaft 57 which has its upper end concentrically secured to the tail stock 45 and which has its lower end connected with a pneumatic brake mechanism 58 that is also connected to the bottom end of the tubular piston rod 54. The bearings 56 constrain the shaft 57, and consequently also the tail stock 45, to rise and descend in unison with the hollow piston rod 54, but they allow the tail stock 45 and its shaft 57 to rotate freely relative to the piston rod 54 provided the pneumatic brake 58 is not engaged.

Because the brake mechanism 58 is connected between the shaft 57 and the hollow piston rod 54, the latter must be prevented from rotating when the brake is applied. To that end there is a laterally extending arm 59 on the bottom of the piston rod 54, slidably engaged with an upright guide rod 60 that is fixed to the stationary structure alongside the cylinder 52. A sensor (not shown), mounted on the stationary structure of the machine, causes the pneumatic brake 58 to be applied whenever the tail stock 45 is in its lowered position and to be released whenever the tail stock is above its lowered position.

At this point it will be apparent that the table 18 is vertically adjustable in accordance with the height of blanks 6 to be processed and is adjusted to a level such that blanks sliding along its top surface will just clear the bottom surface of the driving head 46. With such adjustment to the table 18, a blank needs to be raised only slightly by the tail stock 45 in order to be brought into telescoped relation to the driving head 46 and thereby confined against accidental displacement off of the tail stock. Because the cylinder 52 of the tail stock actuator is secured to the table 18 to move up and down with it, the tail stock structure needs no adjustment to accommodate changes in height of the table 18. The lowered position of the tail stock 45, in which its top surface is level with the top of the table 18, is defined by the lower end of the stroke of the annular piston 53 in the cylinder 52.

The annular driving head 46 is concentrically secured to the bottom of a tubular torque shaft 62 (FIG. 11) which is journaled in vertically spaced upper and lower bearings 63, 64 mounted on the fixed superstructure 13 of the machine frame. Above the bearings 63, 64 a driven pulley 65 is secured to the torque shaft 62, and a drive belt 66 trained around that pulley transmits rotation to the shaft 62 from a motor M (FIG. 1) Constant rotation of the driving head 46 while the machine is in use saves the time and energy that would be needed to accelerate it and decelerate it if it were stopped for each new blank, in the manner of a conventional chuck. Instead, rotational acceleration and deceleration are imparted only to relatively light low-inertia masses.

The bottom of the driving head 46 is polished so that it does not mar the blanks, but it can transmit adequate torque to each blank because the blank is clampingly engaged against it by the tail stock 45.

The knockout 47, which retracts up into the driving head 46 and extends downwardly from it, is actuated for its vertical motion by a double-acting pneumatic jack that has its cylinder 68 mounted on the superstructure 13, concentrically with the driving head 46 and at a substantial distance above the top of its torque shaft 62. The downwardly projecting piston rod 69 of the knockout actuator is connected with the disc-like knockout 47 by means of a long shaft 70 that extends through the tubular torque shaft 62 and the annular driving head 46. At its bottom the knockout shaft 70 has a rigid connection with the knockout 47, and at its upper end it has a rotary connection 71 with the piston rod 69 whereby it is constrained to move up and down with that piston rod but is allowed to rotate relative thereto. The piston rod 69 is confined against rotation by a laterally projecting arm 72 on it that slides along an adjacent upright guide rod 73 on the fixed structure.

The tools 48, 49, 50 that operate upon a blank while it is being rotated in clamped engagement with the driving head 46 are mounted to engage the blank from different radial directions so that they do not interfere with one another. Each of the tools 49, 50 that operates upon the flange 11 is carried on a bracket 74 which is heightwise adjustably mounted on the superstructure 13 and which also carries a hydraulic cylinder jack 75 whereby the tool is actuated radially towards and from the driving head 46. The ironing tool 48 is carried on a compound carriage 76 (FIG. 13) to be movable radially towards and from the blank and axially along it.

The particular tools 48, 49, 50 that are here illustrated are merely exemplary of the known types of tools that can be employed for performing finishing operations upon rotating blanks. In general, the nature and arrangement of such tools, the means for actuating them, and the means for synchronizing them with one another and with raising and lowering of the tail stock 45 will be within the knowledge of those skilled in the pertinent art.

Bulge Forming Station

Figure 17:
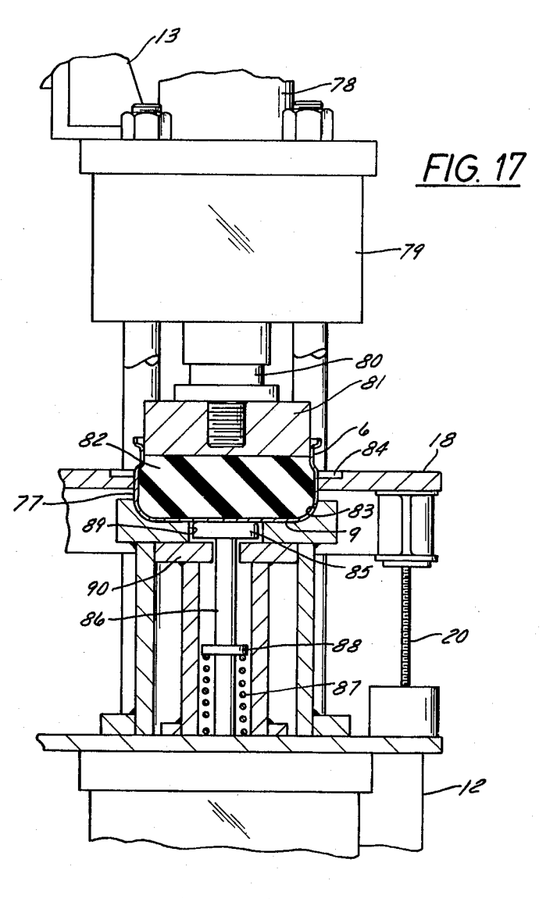
FIG. 17 is a view in vertical section showing conditions at the conclusion of reforming of a blank and just before the male forming member begins to rise.

At the second operating station C any of various operations may be performed upon a blank while it remains stationary. If two such finishing operations are needed that are not suitable for performance at one and the same station, the machine can obviously be arranged with two or more such stations. As here shown, the second operating station is intended for accomplishing an operation which is typical of the kind of work that can be done at that station but which is unconventional, namely, reforming the blank to enlarge the diameter of the bottom portion of its side wall and thus give it a bottom bulge 77 (FIGS. 5 and 17).

Figure 15:
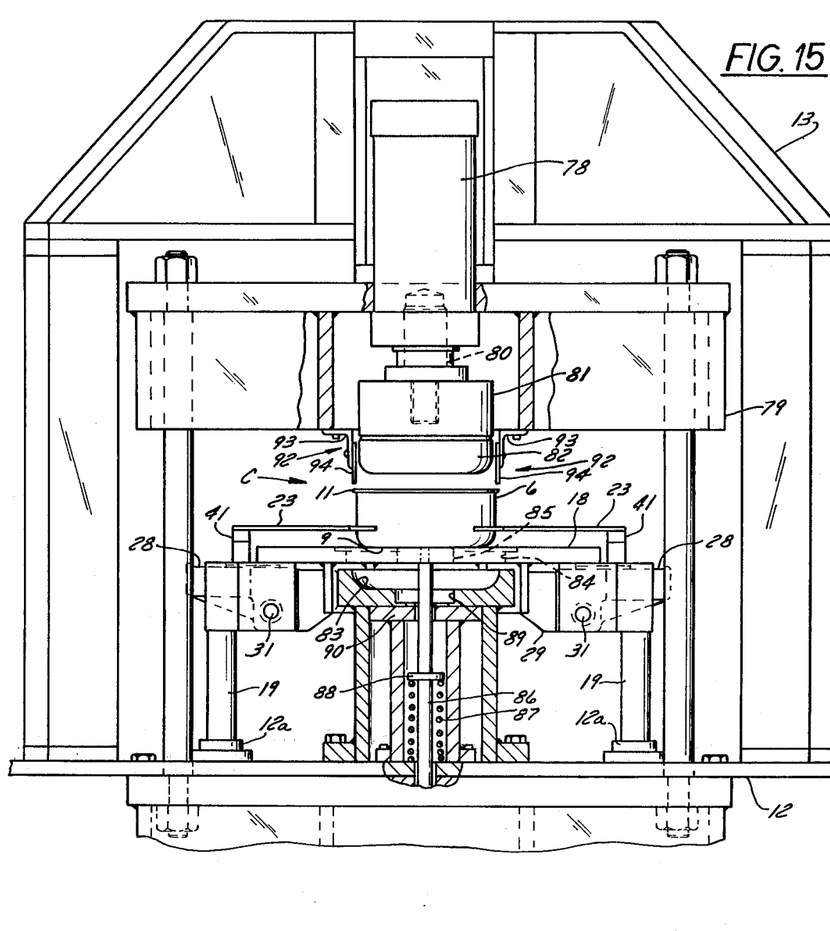
FIG. 15 is a view partly in front elevation and partly in vertical section, showing conditions at the second operating station with a blank just moved into place and the press still open.

Such reforming is accomplished by means of a hydraulic press that has its cylinder 78 mounted above the table 18 on a sturdy elevated press frame 79 fixed on the stationary base portion 12 of the machine, as best seen in FIG. 15. The piston rod or ram 80 of the hydraulic press projects downwardly and has at its bottom a concentric male forming head comprising a rigid disc-like backing member 81 and a resilient forming member 82 of rubber or the like that is secured to the underside of the backing member 81. As the ram 80 descends during a forming operation, the resilient forming member 82 is axially compressed between the rigid backing member 81 and the bottom wall 9 of a blank, and it therefore distends radially, exerting reforming pressure on the side wall 9 of the blank. It will be understood that the backing member 81 and the resilient member 82 are of such diameter as to be receivable in the blank with a small radial clearance when the resilient member 82 is not under compression.

Although other types of female dies may be used with a resilient male forming member, the shallow die 83 here illustrated (FIGS. 14–17) is believed satisfactory for most reforming operations whereby a bulge is imparted to the bottom of the blank. The die member 83 is annular and defines a rather shallow, upwardly opening cavity. It is supported on the fixed structure concentrically with the press 78, 80 and at a level below the table 18. The depth of the bowl-like cavity in the die 83 is such that it controls the form of the rounded junction of the bottom and side walls of the blank and of the lowermost portion of the side wall proper, but, as can be seen from FIG. 17, a portion of the bulge 77 in the blank will be above the die member 83, and the form of that portion of the side wall will be controlled by the axial force imposed upon the resilient forming member 82 and the reactions of the blank to the reforming forces imposed upon it by that forming member.

The table 18 has a hole 84 that is concentric with the press cylinder 78 and the die 83, through which a blank can move down into the die member 83 and up out of it, and which must therefore have a diameter large enough to clear the bulged bottom portion 77 on the blank. When the press ram 80 is in its raised or open position (FIGS. 14 and 15), and a blank is delivered to the second operating station by the shuttle conveyor, the blank is supported on a disc-like knockout 85 which is concentric to the hole 84 in the table 18 and which is then in a raised position wherein its flat top surface is coplanar with the top surface of the table. The knockout 85 is fixed to the top of a concentric rod 86 that extends through a central hole 89 in the annular die member 83 and is guided in the stationary base member 12 for up and down sliding motion. Surrounding the rod 86 is a coiled compression spring 87 that reacts between the fixed structure and a collar 88 that is fixed on the rod 86, biasing the rod upwardly and thus tending to maintain the knockout 85 in its raised position. However, as the press ram 80 descends with the forming member 82 engaging the bottom wall of a blank, the knockout 85 is forced down against the bias of its spring 87 until it enters the hole 89 in the annular die member 83, at which point the blank bottoms in that die and the knockout bottoms on the support 90 for the die member. Since the knockout closely fits the hole 89 in the die member, it then defines the central portion of the die cavity surface, as can be seen from FIG. 16.

As the press ram 80 rises, the knockout 85 rises with it until it reaches its raised position. If the blank should stick to the rising male forming member 82, it will be carried up to only a small distance above the level of the top of the table 18, whereupon it will encounter a stripper 92 that will dislodge it from the forming member. The stripper 92 comprises a pair of channel-section carrier members 93, secured to the fixed frame 79 on which the hydraulic press cylinder 78 is mounted, located at opposite sides of the ram 80 but adjustable towards and from the ram to accommodate blanks of different diameters. Each carrier member 93 supports an edgewise downwardly projecting plate 94, and these plates 94 can either be interchangeable or can be vertically adjustable on the carrier members 93 to accommodate blanks of different heights. The stripper components 93, 94 are so adjusted that when a blank rises with the ram 80 to a level slightly above the top of the table 18, the lower edges of the plates 94 engage diametrically opposite portions of its flange 11 to restrain the blank against further upward movement with the ram.

Typically the hydraulic press 78, 80 has a thirty-ton capacity. Preferably the machine 5 has two hydraulic pumps (not shown), one for the hydraulic press 78, 80, the other for the hydraulic actuators for the tools 48, 49, 50 that operate upon the rotating blank at the first operating station B. With separate hydraulic circuits for the press and for the tool actuators, respectively, actuation of the tools will not interfere with exertion of full force by the forming press and operation of the press will not interfere with tool actuation.

It will be observed that the forming tool actuators are hydraulic, whereas pneumatic actuators are employed for the shuttle conveyor, the tail stock and the driving head knockout, all of which effect movements of the blanks themselves and should therefore be capable of fast action but need not exert high forces.

From the foregoing description taken with the accompanying drawings it will be apparent that this invention provides a fast, efficient, fully automatic machine for performing all finishing operations upon blanks of the type that comprise the body portions of saucepans and similar cookware.

What is being claimed is:

1. A machine for performing a finishing operation upon a metal container blank having a circular bottom wall and an upright side wall that are concentric to an axis of the blank, said operation requiring rotation of the blank about its axis relative to a tool that engages the blank, said machine being characterized by:

A. a tail stock having a substantially horizontal top surface, said tail stock being freely rotatable about an upright station axis and being movable upward from and downward to a lowered position in which its said top surface is at a predetermined level;

B. a conveyor arranged for transporting a blank substantially horizontally onto and off of said tail stock when the same is in said lowered position and whereby the blank is delivered to the tail stock with the bottom wall of the blank resting on said top surface and with the axis of the blank substantially coinciding with said station axis;

C. a driver head confined to rotation about said station axis at a location substantially above said level, to be clear of blanks transported by the conveyor, said driver head having a bottom surface coaxially engageable with the bottom wall of a blank for imparting rotation thereto;

D. drive means for continuously rotating said driver head; and

E. lift means for raising said tail stock above its lowered position and clampingly engaging the bottom wall of a blank thereon against said bottom surface of the driver head, so that the blank can be rotated by the driver head for performance of said operation.

2. The machine of claim 1, further characterized by:
F. brake means located beneath said tail stock, operative when the tail stock is in its lowered position to confine the tail stock against rotation.

3. The machine of claim 1, further characterized by:
F. a freely rotatable knock-out member coaxial with said driver head, said knock-out member being movable between a raised position, received in a downwardly opening coaxial well in said driver head, and a lowered position adjacent to said level; and
G. vertical actuator means for moving said knock-out member downwardly in unison with downward motion of said tail stock.

4. A machine for finishing metal container blanks, each of which has a circular bottom wall and an upright side wall that are concentric to an axis of the blank, said machine having one station whereat each blank is rotated about its axis relative to a tool that engages the blank, said machine being characterized by:
A. a table having a horizontal top surface along which blanks can slide in a transport direction between said one station and another station, said table having therein a hole at said one station that is concentric to an upright station axis;
B. a pair of opposing blank engaging elements that overlie said top surface of the table and are confined to horizontal motion in zones spaced to opposite sides of said station axis;
C. means for moving each of said blank engaging elements in unison with the other along a defined path from an idle position laterally towards the other for engagement with blanks at said stations, then in said transport direction to cooperate with the other in shifting the engaged blanks through the distance between said stations, then laterally away from the other, and then oppositely to said transport direction back to said idle position;
D. a freely rotatable tail stock coaxial with said station axis and movable upwardly from and downwardly to a lowered position wherein said tail stock is in said hole and has its top surface level with said top surface of the table, to receive blanks delivered to said one station;
E. a driver head confined to rotation about said station axis at a location substantially above said level, to be clear of blanks transported by the conveyor, said driver head having a bottom surface coaxially engageable with the bottom wall of a blank for imparting rotation thereto;
F. drive means for continuously rotating said driver head; and
G. lift means for raising said tail stock above its lowered position and clampingly engaging the bottom wall of a blank thereon against said bottom surface of the driver head so that the blank can be rotated by the driver head.

5. The machine of claim 4, further characterized by:
(1) each of said blank engaging elements comprising a substantially flat clamping plate having an edge portion nearest the other blank engaging element wherein there is a bay that enables the blank engaging element to cooperate with the other in embracing a blank at one of said stations; and
(2) said means for moving each blank engaging element along said defined path comprising (a) a lower carriage confined to motion in said transport direction and in the opposite direction and having leg portions at opposite sides of said station axis,
(b) means for actuating said lower carriage in each of said directions,
(c) a pair of upper carriages, to each of which one of said blank engaging elements is secured, each said upper carriage being
(i) carried in one of said leg portions of the lower carriage and
(ii) confined to movement relative to the lower carriage in horizontal directions transverse to said transport direction, and
(d) means carried by said lower carriage for actuating said upper carriages in the last mentioned directions.

6. The machine of claim 5, wherein said table comprises a plate having a pair of opposite edges that extend substantially in said transport direction, further characterized by:
(1) said lower carriage being disposed beneath said table, and
(2) each of said upper carriages having an upwardly projecting portion spaced outwardly from one of said edges of the table and to the top of which the clamping plate is secured and from which the clamping plate projects inwardly over the table.

7. The machine of claim 4 wherein said table has a second hole therein at said other station that is concentric to an upright press axis, further characterized by:
H. a hydraulic press comprising
(1) a cylinder mounted above said table concentrically to said press axis and
(2) a concentric ram movable downwardly into said second hole;
I. a die member fixed beneath said table and having
(1) a central hole therein that is concentric with said press axis and
(2) an upwardly opening concentric cavity in which the bottom portion of a blank is receivable to be reformed by said ram;
J. a die knockout concentric with said press axis and confined to movement between
(1) a raised position in which a top surface on said die knockout is level with said top surface of said table and
(2) a lowered position in which said die knockout is received in said central hole in the die member and the top surface of the die knockout effectively defines a portion of the surface of said cavity; and
K. means yieldingly biasing said die knockout to its raised position.

8. The machine of claim 7 further characterized by:
L. a forming element on the bottom of said ram comprising
(1) a rigid concentric backing member receivable in a blank and
(2) a resiliently deformable forming member concentrically secured to the underside of said backing member.

9. A machine for performing finishing operations upon metal container blanks, each having a circular bottom wall and an upright side wall that are concentric to an axis of the blank, said machine having a plurality of horizontally spaced apart stations to which blanks are advanced successively, one of said stations being arranged for performance of an operation that requires rotation of the blank relative to a tool that engages it, said machine being characterized by:

- A. a table having a horizontal top surface that extends across said stations and upon which the bottom walls of blanks are slidable during advance of blanks from station to station, said table having a hole therein at said one station that is concentric to an upright station axis;
- B. a freely rotatable tail stock concentric to said station axis, said tail stock being movable upwardly from and downwardly to a lowered position wherein said tail stock is in said hole in the table and a top surface of the tail stock is level with said top surface of the table;
- C. horizontally movable conveyor means above the table, engageable with opposite side portions of blanks at said stations for sliding advance of those blanks and whereby a blank advanced to said one station is deposited concentrically on said tail stock;
- D. a driver head continuously rotatable concentrically to said station axis at a location spaced above said table, said driver head having a bottom surface engageable with a bottom wall of a blank; and
- E. means for exerting upward force upon said tail stock to raise it from its lowered position and clampingly engage the bottom wall of a blank thereon against said bottom surface of the driver head to constrain the blank to rotate with the driver head.

10. The machine of claim 9, further characterized by:
- F. brake means operative only when said tail stock is in its lowered position for confining the tail stock against rotation.

11. The machine of claim 9 wherein said bottom surface of the driver head is annular and the driver head has a downwardly opening concentric well therein, further characterized by:
- F. a knockout concentric to said driver head and movable upwardly to and downwardly from a raised position in said well in the driver head; and
- G. means for actuating said knockout downwardly from its raised position in unison with downward motion of said tail stock so that the knockout and the tail stock can maintain clamping engagement with the bottom wall of a blank while the blank is lowered to the level of the table from engagement with the driver head.

12. The machine of claim 11, further characterized by:
- H. an upright tubular torque shaft confined to rotation and having said driver head concentrically fixed to its bottom end, said torque shaft having means thereon, spaced above said driver head, for imparting rotation thereto;
- I. a knockout rod extending axially slidably through said torque shaft and the driver head and on the bottom end of which said knockout is concentrically carried; and
- J. said means for actuating said knockout comprising cylinder and piston members concentric to said station axis,
  - (1) one of said members being fixed above said torque tube and
  - (2) the other of said members being connected with the upper end of said knockout rod.

13. The machine of claim 9, further characterized by:
- (1) said table comprising a heightwise adjustable plate that defines said horizontal top surface; and
- (2) said means for exerting upward force upon said tail stock comprising
  - (a) a jack cylinder fixed to the underside of said plate with its axis coinciding with said station axis,
  - (b) a coaxial piston, and
  - (c) a connection between said piston and the tail stock whereby the tail stock is rotatable relative to the piston and is constrained to up and down motion therewith.

14. The machine of claim 13 wherein said piston is annular, further characterized by:
- (1) said piston having a tubular piston rod that projects beyond both ends of the jack cylinder;
- (2) said tail stock being coaxially secured to the upper end of a tail stock rod that extends downwardly through said piston and said tubular piston rod;
- (3) said connection between the piston and the tail stock comprising a bearing supported by an upper end portion of said piston rod and surrounding said tail stock rod;
- (4) a brake mechanism connected between the lower end portion of said piston rod and a lower end portion of said tail stock rod; and
- (5) means for preventing rotation of said tubular piston rod.

* * * * *